(12) United States Patent
Melanson et al.

(10) Patent No.: US 8,475,881 B1
(45) Date of Patent: Jul. 2, 2013

(54) GOLF BALL ADHESION PROMOTER

(75) Inventors: David M. Melanson, Feeding Hills, MA (US); Vincent J. Simonds, Brimfield, MA (US); Shane R. Parnell, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 335 days.

(21) Appl. No.: 13/075,525

(22) Filed: Mar. 30, 2011

Related U.S. Application Data

(60) Provisional application No. 61/319,407, filed on Mar. 31, 2010.

(51) Int. Cl.
*A63B 37/00* (2006.01)
*C09D 175/04* (2006.01)
*C09J 175/04* (2006.01)

(52) U.S. Cl.
USPC .............. 427/393.5; 427/207.1; 427/430.1; 264/510; 264/250; 264/279.1; 156/331.7; 473/374; 524/591; 525/454

(58) Field of Classification Search
None
See application file for complete search history.

(56) References Cited

U.S. PATENT DOCUMENTS

| | | | | |
|---|---|---|---|---|
| 5,300,325 A | * | 4/1994 | Nealon et al. | 427/379 |
| 5,907,012 A | * | 5/1999 | Voss et al. | 524/591 |
| 6,905,423 B2 | * | 6/2005 | Morgan et al. | 473/376 |
| 7,241,232 B2 | | 7/2007 | Sullivan et al. | |
| 7,244,196 B2 | | 7/2007 | Kennedy, III et al. | |
| 7,338,391 B2 | | 3/2008 | Melanson et al. | |
| 7,534,384 B2 | | 5/2009 | Tzivanis et al. | |
| 2005/0037866 A1 | * | 2/2005 | Emerson et al. | 473/371 |
| 2009/0143170 A1 | * | 6/2009 | Ohira et al. | 473/385 |
| 2011/0244983 A1 | * | 10/2011 | Shen et al. | 473/371 |

* cited by examiner

*Primary Examiner* — David Buttner
(74) *Attorney, Agent, or Firm* — Sonia Lari; Michael A. Catania; Rebecca Hanovice

(57) ABSTRACT

The present invention is a method for forming a golf ball, the method comprising mixing an aqueous polyurethane dispersion with an azridine to form an aqueous polyurethane dispersion/aziridine mixture. Then, adding the aqueous polyurethane dispersion/aziridine mixture to a water tank, to form a PUD/aziridine solution and dipping a polybutadiene core in the PUD/aziridine solution. The PUD/aziridine solution comprises 0.4 percent aziridine, 4 percent aqueous polyurethane dispersion, and 95.6 percent de-ionized water, which forms a dipped polybutadiene core. The dipped polybutadiene core is then dried at room temperature.

8 Claims, 3 Drawing Sheets

GOLF BALL ADHESION PROMOTER

CROSS REFERENCES TO RELATED APPLICATIONS

This application claims priority to U.S. Provisional Patent Application No. 61/319,407 filed on Mar. 31, 2010.

STATEMENT REGARDING FEDERALLY SPONSORED RESEARCH OR DEVELOPMENT

Not Applicable

BACKGROUND OF THE INVENTION

1. Field of the Invention

The present invention relates to the manufacture of golf balls. Particularly to the manufacture of golf balls comprising a polybutadiene core and polymeric layer.

2. Description of the Related Art

The prior art discloses various methods, including plasma, corona discharge, silane and chlorination based adhesion techniques, for the treatment of inner cover layers of golf balls to improve adhesion between inner and outer cover layers. Golf balls exhibiting poor adhesion between the core and adjacent layers can result in poor high speed impact durability due to layer delamination. Manufacturing techniques for golf balls utilizing polymeric layers and polybutadiene cores with improved characteristics, including reduced layer delamination and improved impact durability have not been disclosed.

The use of the technology a polyurethane dispersion, PUD, and an aziridine overcomes the problem of poor adhesion between polybutadiene cores and polymeric layers. This technology produces a golf ball polyurethane cover with improved durability, resilience, feel, spin and impact durability.

BRIEF SUMMARY OF THE INVENTION

The major goal of this invention is provide improved adhesion between a cross-linked polybutadiene core and highly neutralized polymer layer resulting in improved golf ball impact durability, which is accomplished using an aqueous polyurethane dispersion and aziridine promotor applied to the surface of the polybutadiene core.

One aspect of the present invention is a method for forming a golf ball, the method comprising mixing an aqueous polyurethane dispersion with an azridine to form an aqueous polyurethane dispersion/aziridine mixture. Then, adding the aqueous polyurethane dispersion/aziridine mixture to a water tank, to form a PUD/aziridine solution and dipping a polybutadiene core in the PUD/aziridine solution. The PUD/aziridine solution comprises 0.4 percent aziridine, 4 percent aqueous polyurethane dispersion, and 95.6 percent de-ionized water, which forms a dipped polybutadiene core. The dipped polybutadiene core is then dried at room temperature.

Another aspect of the present invention is a golf ball with improved adhesion between the polybutadiene core and the adjacent polymeric layer. The golf ball comprises a dipped polybutadiene core. The dipped polybutadiene core comprises an adhesion promotor, the adhesion promotor comprising an aqueous polyurethane dispersion, an aziridine, and de-ionized water. The golf ball further comprises a polymeric layer formed over the dipped polybutadiene core. The aqueous polyurethane dispersion is preferably WITCOBOND 235S and the aziridine is preferably NEOCRYL CX-100. The polymeric layer is preferably DUPONT HPF.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
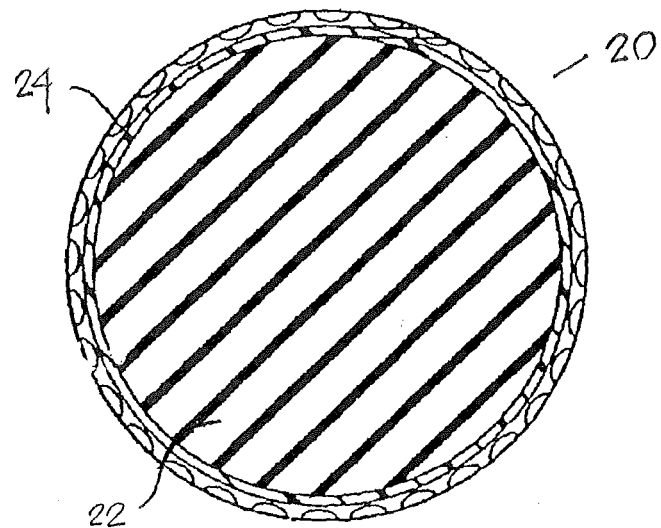
FIG. 1 is a perspective view of the present invention.
Figure 2:
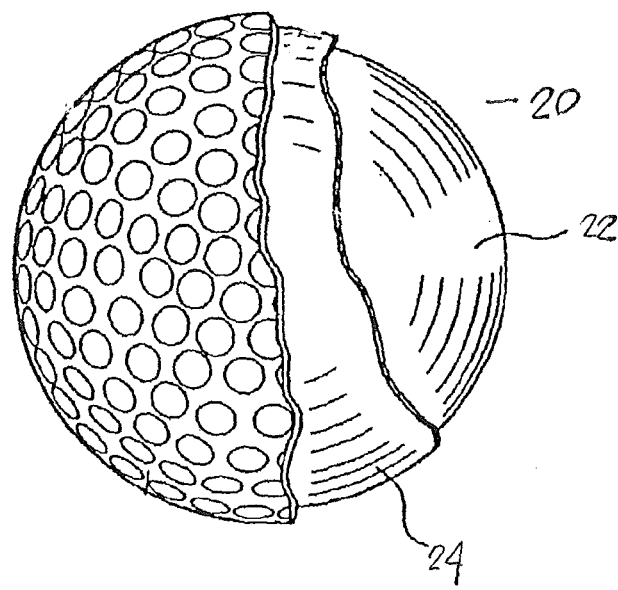
FIG. 2 is a cross sectional view of the present invention.
Figure 3:
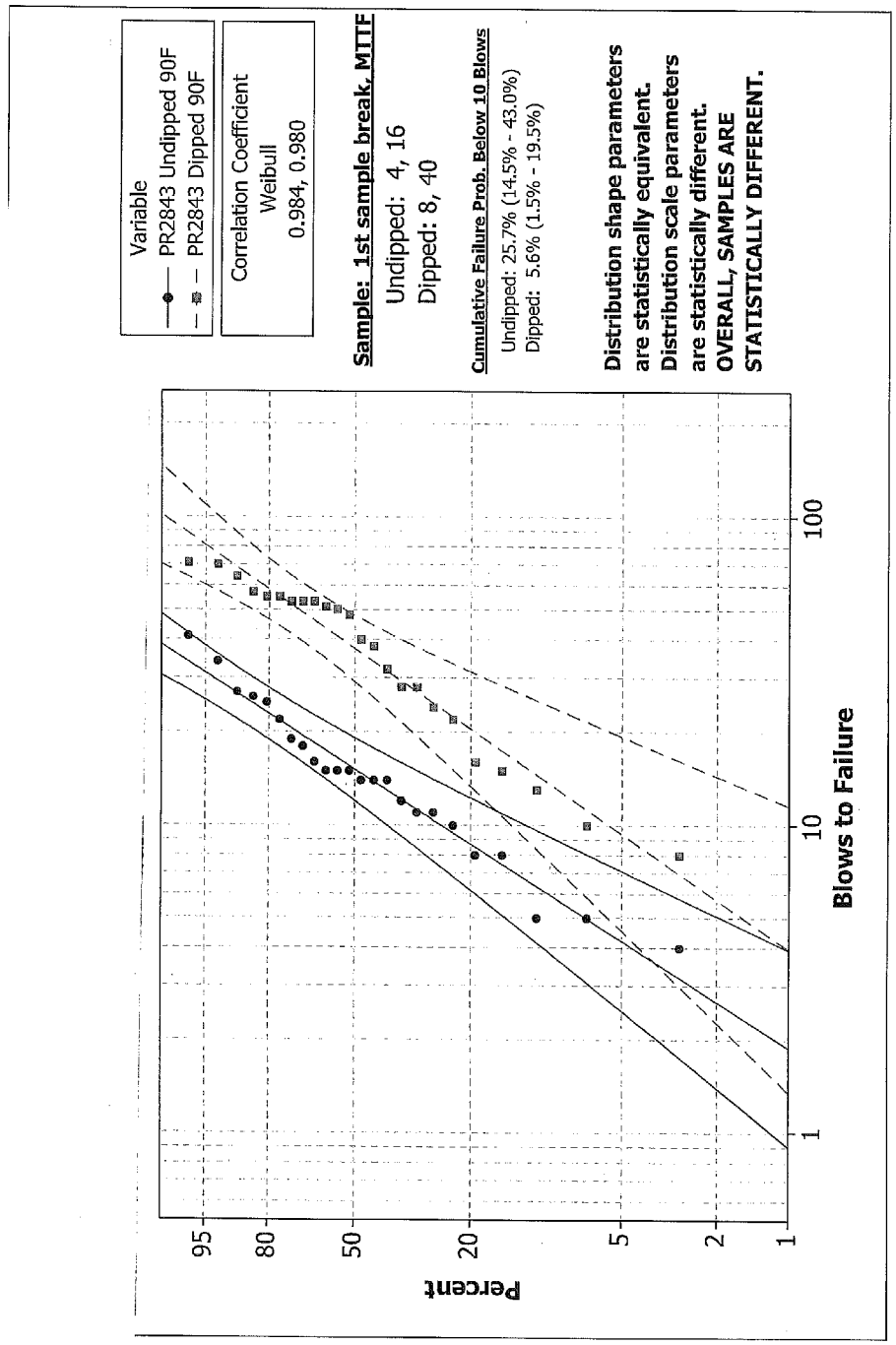
FIG. 3 is a chart showing the improved characteristics of the golf ball using the adhesion promotor.
Figure 4:
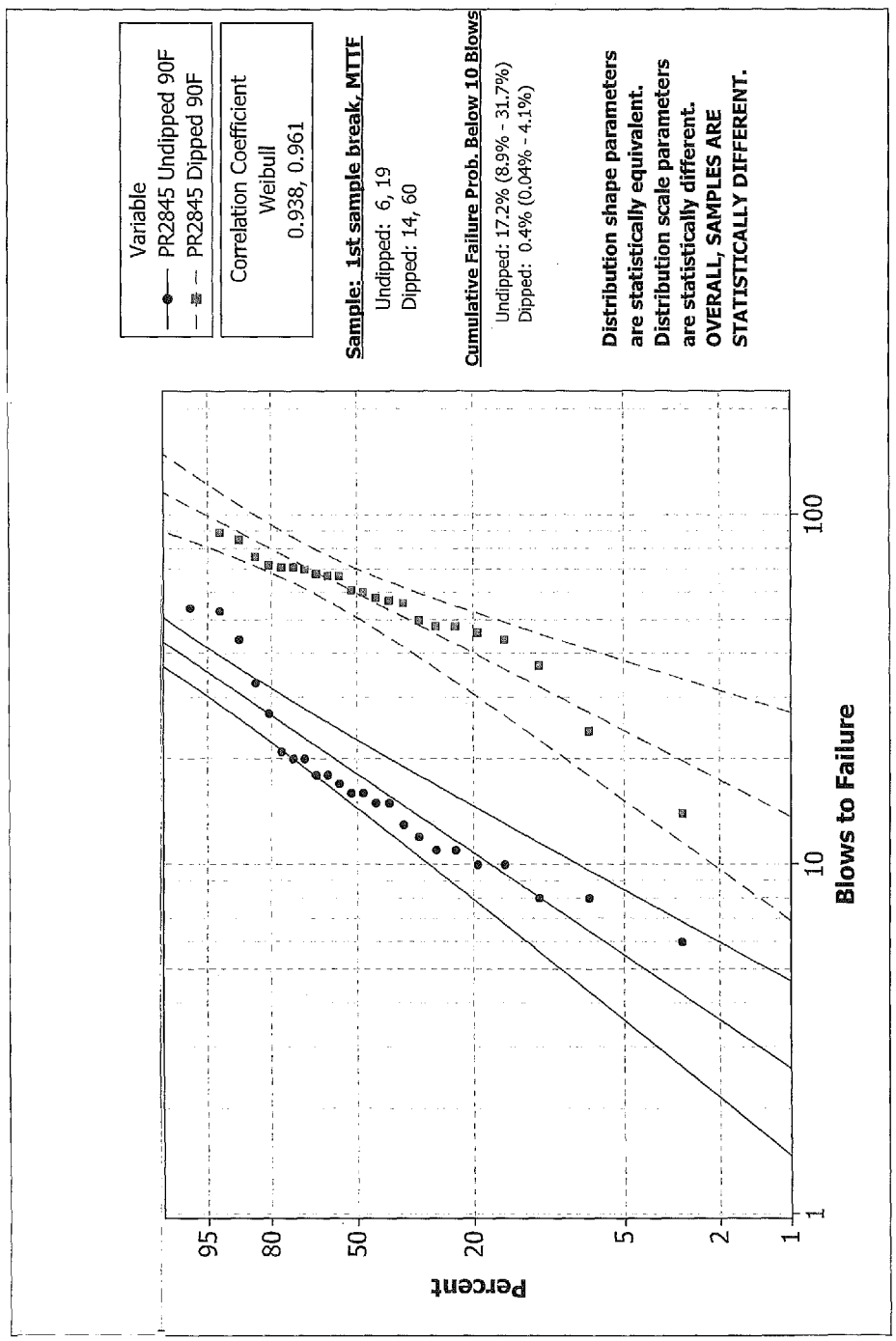
FIG. 4 is a chart showing a second type of golf exhibiting the same improved characteristics using the adhesion promotor.

One aspect of the present invention is a method for forming a golf ball 20. The method comprises mixing an aqueous polyurethane dispersion with an azridine to form an aqueous polyurethane dispersion/aziridine mixture. Then, adding the aqueous polyurethane dispersion/aziridine mixture to a water tank to form a PUD/aziridine solution. Next, dipping the polybutadiene core 22 in the PUD/aziridine solution, the PUD/aziridine solution comprising 0.4 percent aziridine, 4 percent aqueous polyurethane dispersion, and 95.6 percent de-ionized water to form a dipped polybutadiene core 22. Lastly, the dipped polybutadiene core 22 is dried at room temperature.

In one embodiment, the polybutadiene core 22 is dipped in the PUD/aziridine solution from 3 to 5 minutes. Further, a polymeric layer 24 is formed around the polybutadiene core 22 using injection molding. In another embodiment, the polybutadiene core 22 is dried for 30 minutes prior to forming a polymeric layer 24 around the polybutadiene core 22. In yet another embodiment, the polymeric layer 24 is a highly neutralized polymer containing a fatty acid. One example of such a highly neutralized polymer containing fatty acids is DUPONT HPF. In yet another embodiment, the polybutadiene core 22 and polymeric layer 24 are post baked for 2 hours at 150° Fahrenheit.

Another aspect of the present invention is a golf ball 20 with improved adhesion between the polybutadiene core 22 and the adjacent polymeric layer 24. The golf ball 20 comprises a dipped polybutadiene core 22, the dipped polybutadiene core 22 comprising an adhesion promotor. The adhesion promotor comprises an aqueous polyurethane dispersion, an aziridine, and de-ionized water. A polymeric layer 24 is formed over the dipped polybutadiene core 22.

In one embodiment, the polymeric layer 24 comprises a highly neutralized polymer containing a fatty acid. Preferably, the polymeric layer 24 is formed over the polybutadiene core 22 using injection molding.

Various reaction injection molding methods are disclosed in U.S. Pat. No. 7,244,196 for a Golf Ball Which Includes Fast-Chemical-Reaction-Produced Component and Method of Making Same, U.S. Pat. No. 7,534,384 for Process For Producing a Golf Ball with Deep Dimples, U.S. Pat. No. 7,241,232 for Golf Ball Having Dual Core and Thin Polyurethane Cover Formed by RIM and U.S. Pat. No. 7,338,391 for Golf Ball Which Includes Fast-Chemical-Reaction-Produced Component and Method of Making Same which are all owned by Callaway Golf Company and which pertinent parts are hereby incorporated by reference.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for forming a golf ball, the method comprising:
   mixing an aqueous polyurethane dispersion with an aziridine, to form an aqueous polyurethane dispersion/aziridine mixture;
   adding the aqueous polyurethane dispersion/aziridine mixture to a water tank, to form a PUD/aziridine solution;
   dipping a polybutadiene core in the PUD/aziridine solution, the PUD/aziridine solution comprising 0.4 percent aziridine, 4 percent aqueous polyurethane dispersion, and 95.6 percent de-ionized water, to form a dipped polybutadiene core;
   drying the dipped polybutadiene core at room temperature.

2. The method according to claim 1 wherein the polybutadiene core is dipped in the PUD/aziridine solution from 3 to 5 minutes.

3. The method according to claim 2 further comprising air drying the dipped polybutadiene core.

4. The method according to claim 1 further comprising forming a polymeric layer around the polybutadiene core using injection molding.

5. The method according to claim 4 wherein the polybutadiene core is dried for 30 minutes prior to forming a polymeric layer around the polybutadiene core.

6. The method according to claim 4 wherein the polymeric layer is a highly neutralized polymer containing a fatty acid.

7. The method according to claim 4 wherein the polybutadiene core and polymeric layer are post baked for 2 hours at 150° degrees Fahrenheit.

8. The method according to claim 5 wherein a second polymeric layer is formed around the polybutadiene core.

* * * * *